Aug. 29, 1939.  T. W. LANGLEY  2,171,450
MEANS FOR DETECTING ICE FORMING CONDITIONS, PARTICULARLY
WHEN ENCOUNTERED BY AIRCRAFT
Filed Aug. 17, 1938   3 Sheets-Sheet 1

INVENTOR,
Thomas Winemore Langley,
& Frank S. Appleman,
ATTORNEY.

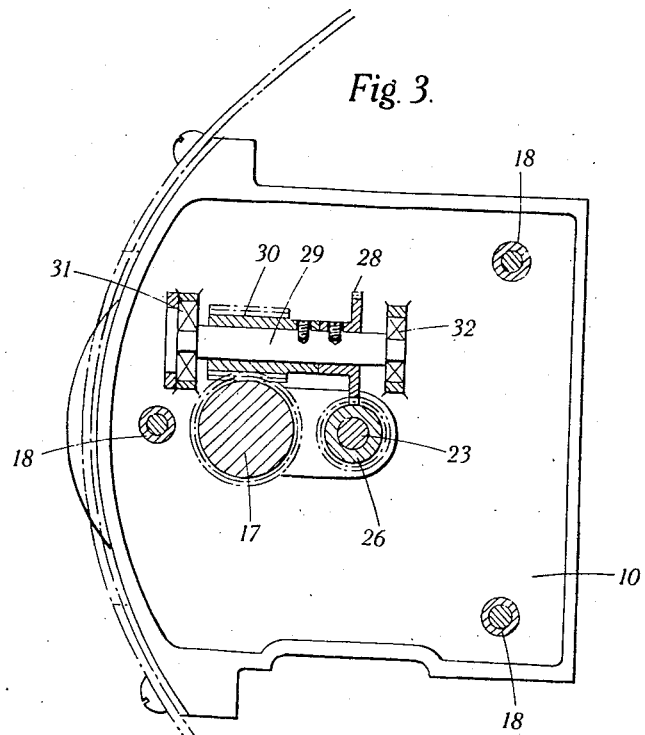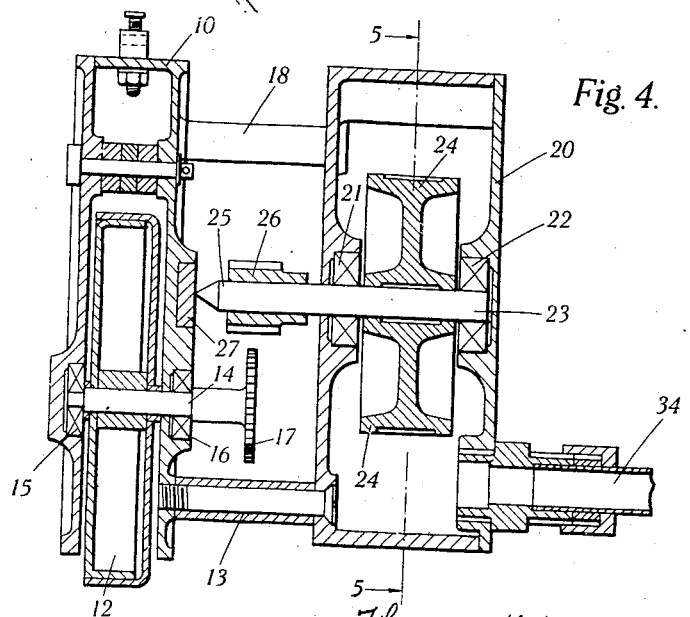

Patented Aug. 29, 1939

2,171,450

UNITED STATES PATENT OFFICE 2,171,450

MEANS FOR DETECTING ICE FORMING CONDITIONS, PARTICULARLY WHEN ENCOUNTERED BY AIRCRAFT

Thomas Winsmore Langley, Osterley, England, assignor to Tecalemit Limited, Brentford, England Application August 17, 1938, Serial No. 225,428
In Great Britain July 22, 1937

14 Claims. (Cl. 200—52)

This invention has for its object the provision of a device for detecting ice-forming conditions and while the device is particularly applicable to aircraft it may be employed in any other cases where it is desired to detect conditions of ice formation. For simplicity of description, however, the invention will be described with reference to its application to aircraft.

The formation of ice on the wings and other parts of aircraft constitutes a serious danger, since the ice may form very rapidly, and by altering the profile of the wings and by increasing the total weight of the aircraft, may cause the latter to lose height to a dangerous extent. It is therefore desirable that the pilot should have early warning when ice formation begins, in order that he may either fly the aircraft to a different altitude where these conditions no longer exist, or may put the de-icing equipment into operation.

It is accordingly an object of this invention to provide a device which will warn the pilot by visible and/or audible means when ice formation starts. Alternatively, the device may be arranged automatically to put the de-icing equipment into operation, this being accompanied, if desired, by a suitable visible and/or audible indication to the pilot.

The device according to the present invention comprises a movable member and means for detecting the presence of ice thereon, the said member being adapted to be moved so that part of it passes an exposed position where ice may readily form under suitable atmospheric conditions and a position where the presence of any ice formed on the member may be detected by the said means.

The movable member may consist of a rotatable disc or a wheel which is rotatably mounted in a casing or in a part of the aircraft structure itself, a part of the circumference of the wheel or disc projecting exteriorly of the casing or the part of the structure of the aircraft through a suitable aperture into the position in which ice formation is liable to occur. In this construction, the disc is adapted to be rotated continuously while the device is in operation and means are provided within the casing or the aircraft structure, as the case may be, for detecting the presence on the disc of ice which forms on the exposed part of the disc and is carried by the rotation of the latter to the region of the ice-detecting means which is located within the casing or structure where it is safe from risk of damage.

The ice-detecting means according to one embodiment of the invention comprises at least one contact member adapted to engage the surface of the disc continuously as the latter rotates. The contact member and the disc may be electrically conducting and adapted to close an electrical circuit when they are in contact but to break the circuit when they are separated by the presence of a film of ice. It has been found that, while the contact between the said member and the disc is substantially unaffected by the presence of moisture, a very thin film of ice is sufficient effectively to break the circuit.

Alternatively, instead of the ice layer itself being used to break the circuit the actual movement of the contact member as a result of the presence of a layer of ice on the disc may be caused to make a circuit, a contact mounted on the member being caused to engage with a fixed contact. This arrangement has the advantage that electrical energy is only used when ice is actually present.

In the case of an aeroplane, the device is preferably arranged so that the disc or equivalent member projects from the leading edge of a wing or other aerofoil or any other part of the aircraft, such as a strut or control surface, where early ice formation is liable to occur. The disc is preferably rotated at a relatively low speed and any suitable means, such as a small propeller or air motor, may be provided for this purpose.

In order that the said invention may be clearly understood, one embodiment of the same will now be more fully described, by way of example, with reference to the accompanying drawings, in which:

Figure 3 is a sectional elevation of the device on the line 3—3 in Figure 2;

Figure 4 is a sectional plan view of the device on the line 4—4 in Figure 2.

Figure 1:
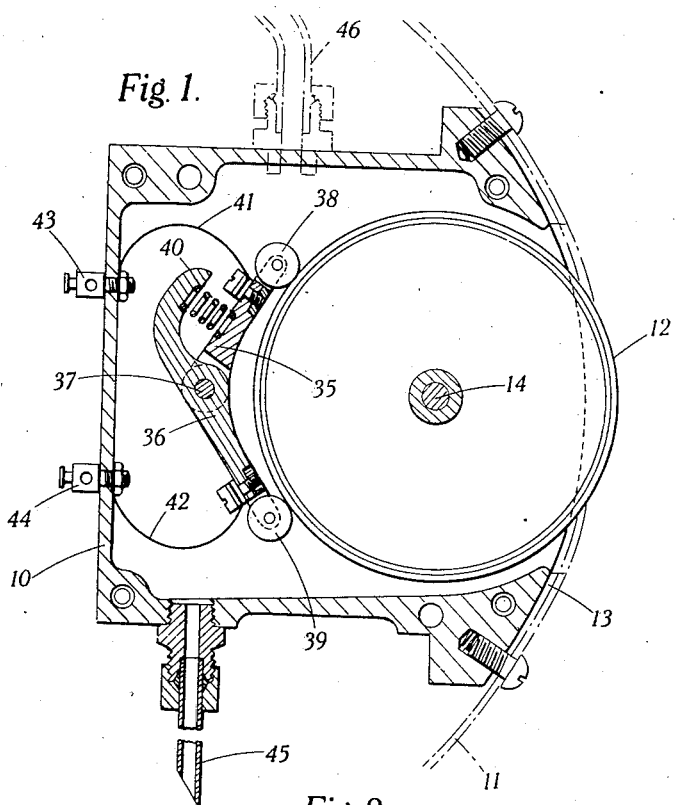
Fig. 1 is a vertical sectional view, on the line 1—1 in Figure 2, of a device constructed according to the invention which is suitable for mounting in the leading edge of a wing or other aerofoil member of an aircraft.

Referring to the drawings, there is shown a structure wherethrough successive portions of this device may be exposed to bring the successive portions into such position as to be acted upon for the formation of ice and such structure will naturally have an opening for this exposure. In the device as here shown, there is disclosed such a housing, casing or member 10 wherein the casing 10 of the device is preferably made of a suitable insulating material and is adapted to be mounted within the leading edge 11 of an aeroplane wing. The wing is formed with a suitable aperture to allow the rim of a hollow disc 12 to project, a suitable packing 13 being preferably provided within the wing and being arranged to form a close but free fit with the disc.

Figure 2:
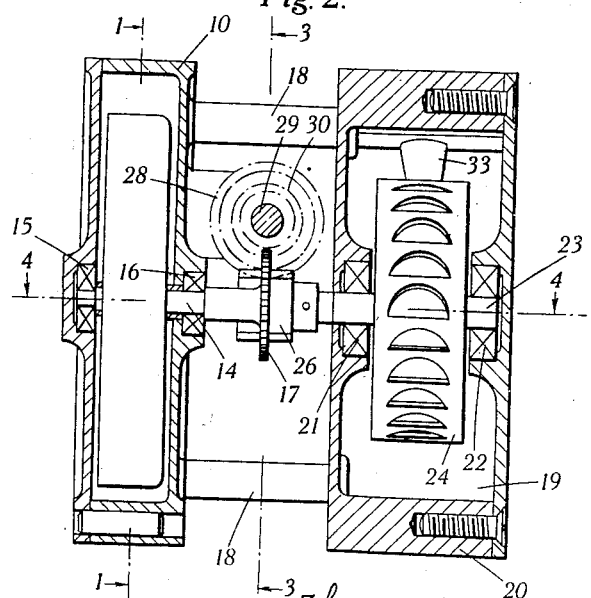
Fig. 2 is a vertical section of the device as viewed from the front.
Figure 5:
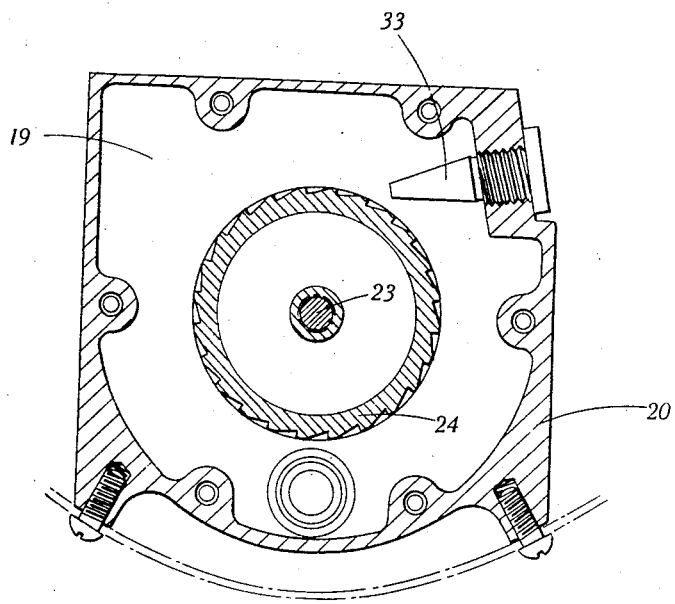
Figure 5 is a section on the line 5—5 in Figure 4 showing more particularly the air motor for driving the wheel.

The disc is secured to a shaft 14 which, as shown in Figures 2, and 4, is rotatably mounted in bearings 15 and 16 carried by the casing 10. A toothed wheel 17 is attached to or formed integrally with the shaft 14.

Attached to, but spaced from, the casing 10 by members 18, Figures 2 and 4, is an air motor, indicated generally at 19, comprising a casing 20 carrying bearings 21 and 22 in which a shaft 23 is rotatably mounted. The shaft carries the vaned rotor 24 of the air motor and, at its end 25, a worm 26. A thrust plate 27 is mounted on the casing 10 and is engaged by the pointed end 25 of the shaft 23.

As is shown more clearly in Figures 2 and 3, the worm 26 meshes with a worm wheel 28 mounted on a shaft 29, which also carries a worm 30 meshing with the toothed wheel 17 on the shaft 14, the shaft 29 being rotatably mounted in bearings which are indicated at 31 and 32 in Figure 3. It will be seen that by this arrangement rotation of the rotor 24 causes the disc 12 to rotate at a reduced speed.

The motor 19 comprises an air inlet jet 33 which is adapted to direct air on to the rotor 24 and which communicates with the outside of the casing 20. A pipe 34 provides communication with a venturi or other source of vacuum (not shown) and the reduced pressure produced thereby within the casing 20 causes a jet of air to be drawn into the casing through the jet 33 and to impinge on and to rotate the rotor 24.

As shown in Figure 1, the means for detecting ice on the disc 12 comprises, according to this embodiment of the invention, a pair of levers 35 and 36 made of insulating material. These levers are pivoted at 37 on a common fulcrum and carry at their respective ends metal contact rollers 38 and 39. A spring indicated at 40 is provided between the levers 35 and 36 and acts to press the rollers 38 and 39 on to the metal disc 12, flexible connections 41 and 42 connecting the contact rollers 38, 39 to terminals 43 and 44 respectively.

The terminals 43 and 44 are connected in an electric circuit which includes a suitable visual or audible warning device and/or a suitable relay or servo device for setting the de-icing equipment in operation. Thus the terminals may be included in a circuit comprising a suitable source of current and a lamp bulb. So long as no ice forms on the disc 12 the circuit will be completed through the roller 38 the disc 12 and the roller 39 and the lamp will glow, showing the pilot that the conditions are normal. As soon, however, as ice forms on the exposed part of the disc 12, the rotation of the latter will bring its ice covered-part round to the roller 38 or the roller 39. The film of ice will act as a substantially non-conducting layer and will break the circuit and extinguish the lamp thus indicating to the pilot the fact that ice has started to form. Since only a very thin layer of ice is required to operate the device, the pilot will be warned of the existence of ice-forming conditions before he will be able to observe the actual formation of ice on the aircraft itself.

As shown in Figure 1 of the drawings, the casing 10 may be provided with a drain pipe 45 for the escape of water together with any dirt which may find its way into the casing. If desired, a pipe may open into the top of the casing as shown in broken lines at 46 the other end of the pipe in this case being led to a region of normally low air pressure, such as the upper surface of the aeroplane wing, for the purpose of drawing off moisture or dirt from the interior of the casing.

What I claim is:

1. A device for detecting conditions of ice formation comprising a movable member on which ice can form and means for detecting the presence of ice thereon, the said member being adapted to be moved so that part of it passes successively an exposed position where ice may readily form on the member under suitable atmospheric conditions and a position where the presence of any ice formed on the member may be detected by the said means.

2. A device as claimed in claim 1, wherein the means for detecting the presence of ice on the movable member comprises an element bearing against the member.

3. A device for detecting conditions of ice formation on aeroplanes and the like, and including a housing element having an exposure opening, a movable member in said housing and positioned for exposure of successive portions of its surface at said opening, and means operatively associated with said member and actuated by ice thereon for disclosing the presence of such ice.

4. A device for detecting conditions of ice formation on aeroplanes and the like, and including a housing element having an exposure opening, a movable member in said housing and positioned for exposure of successive portions of its surface at said opening, and a feeler element normally engaging the ice collecting surface of the movable member and adapted to be moved away from said member by ice formed thereon.

5. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, and other means operatively associated with said member and actuated by ice thereon for disclosing the presence of ice on said member.

6. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, the periphery of said member being of electrically conducting material, and a pair of contacts normally engaging the conducting periphery of the member.

7. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, the periphery of said member being of electrically conducting material, a pair of arms pivoted adjacent said member and having their free ends spring urged toward said member, and a pair of electrical contacts insulated from each other and carried by the free ends of said arms.

8. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, and other means operatively associated with said member and actuated by ice thereon for disclosing the presence of ice on said member, the means for operating said member including an air motor operable by the movement of the aircraft through the air.

9. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, the periphery of said member being of electrically conducting material, and a pair of contacts normally engaging the conducting periphery of the member, the means for operating said member including an air motor operable by the movement of the aircraft through the air.

10. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, the periphery of said member being of electrically conducting material, a pair of arms pivoted adjacent said member and having their free ends spring urged toward said member, and a pair of electrical contacts insulated from each other and carried by the free ends of said arms, the means for operating said member including an air motor operable by the movement of the aircraft through the air.

11. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, other means operatively associated with said member and actuated by ice thereon for disclosing the presence of ice on said member, the means for operating said member including an air motor operable by the movement of the aircraft through the air, and a speed reduction gearing interposed between the motor and said member whereby the member revolves slowly across said opening.

12. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, the periphery of said member being of electrically conducting material, a pair of contacts normally engaging the conducting periphery of the member, the means for operating said member including an air motor operable by movement of the aircraft through the air, and a speed reduction gearing interposed between the motor and said member whereby the member revolves slowly across said opening.

13. A device for detecting conditions of ice formation on aircraft and the like, and including a housing element having an exposure opening, a rotatable member mounted in said housing element in position for exposure of successive portions of the periphery of said member through said opening whereby the member may accumulate ice on its periphery under ice forming conditions, means for rotating said member, the periphery of said member being of electrically conducting material, a pair of arms pivoted adjacent said member and having their free ends spring urged toward said member, a pair of electrical contacts insulated from each other and carried by the free ends of said arms, the means for operating said member including an air motor operable by the movement of the aircraft through the air, and a speed reduction gearing interposed between the motor and said member whereby the member revolves slowly across said opening.

14. A device for detecting conditions of ice formation on aircraft and the like, including a housing element having an exposure opening, a movable member in said housing and positioned for exposure of successive portions of its surface at said opening, the ice collecting surface being of electrically conducting material, a feeler element normally engaging the said surface and adapted to close an electrical circuit including the said movable member and said feeler element, the said circuit being adapted to be broken when the feeler element is moved away from the surface of said member by ice formed thereon.

THOMAS WINSMORE LANGLEY.